United States Patent Office 3,305,604
Patented Feb. 21, 1967

3,305,604
PEARLESCENT POLYESTER COMPOSITIONS
Gerald M. Armstrong, Gordon C. Newland, and John W. Tamblyn, Kingsport, Tenn., assignors to Eastman Kodak Company, Rochester, N.Y., a corporation of New Jersey
No Drawing. Filed Jan. 22, 1965, Ser. No. 427,490
12 Claims. (Cl. 260—860)

This invention relates to a process for the production of polyester biphase plastic compositions and more particularly to compositions of this type which have a pearlescent appearance, especially when extruded in the form of sheets, film, and the like. The process and product of this invention are particularly characterized by the fact that no pigments, pearl essence or other materials usually employed for producing nacreous effects in plastics are used in obtaining the pearlescent appearance of the product, this effect being obtained solely by virtue of the physical and chemical nature of the polyester or copolyester material employed and the conditions under which the product is produced.

It is known to produce plastic products from two different polymeric plastic materials by dissolving a copolymer of isobutylene and isoprene in monomeric styrene, polymerizing the styrene-copolymer solution or mixture by extended heating, then comminuting and injection molding the resulting composition. Such a process is disclosed in the Fordham U.S. Patent 2,817,118 and the product is said to have a pearlescent appearance. No reference is made in this patent to the employment of any type of polyester or copolyester material and the pearlescent effect is apparently obtained by the polymerization in situ of the styrene under the critical conditions specified and the subsequent injection molding of the product of the polymerization.

In the Goessling U.S. Patent 2,353,457, there is disclosed a process of producing a laminated or stratified plastic sheet product by mixing clear plastics or one clear plastic and one translucent plastic and subjecting the mixture to heat and pressure. It is said that a product having a stratified pearlescent appearance may be produced in this manner by mixing a molding powder of polystyrene and a molding powder of Lucite (polymethyl methacrylate) in substantially equal quantities, feeding the mixture to an injection molding machine of conventional design and extruding the resulting mixture under heat and pressure to form a sheet material.

U.S. Patent No. 3,061,592 of Schnell et al. discloses that polyamides may be produced in pearly form from cyclic lactams by suspending a polymerizable cyclic lactam in an inert fluid or melt in which the lactam is insoluble or only slightly soluble at polymerization temperatures lying above the melting point of the lactam but below the softening point of the polyamide. The mixture is then heated to the polymerization temperature and, at the end of the polymerization the polymerizate is recovered. The polymerizate is stated to be in the form of pearly spheroids.

It is also known from the disclosure of U.S. Patent 2,623,031 to produce elastomers, which may be formed into sheets, films and fibers having a high degree of extensibility and elastic recovery, from critical mixtures of certain polyesters and copolyesters. There is, however, no reference in this disclosure to the production of any type of pearlescent effect in the products thus produced.

It is an object of this invention to provide a process of producing a biphase plastic product having a pearlescent appearance without the use of pigments, pearl essence or other substances generally employed to produce such effects.

Another object is to provide a process for making biphase polyester plastic products which is simple to operate and avoids the complicated control and techniques usually necessary in the production of pearlescent plastic material.

Another object is to provide a process of producing polyester plastic products having a pearlescent appearance from materials which may be readily employed and used by a manufacturer of such products.

Another object is to provide a new and improved biphase polyester plastic composition having a pearlescent appearance.

A further object is to provide a new and improved biphase polyester plastic product in the form of sheets, films and other products having a pearlescent appearance.

Another object is to provide biphase polyester products having a pleasing pearlescent appearance without the use of pigments, pearl essence of other nacreous substances.

Other objects will appear hereinafter.

These objects are accomplished by the following invention which, in its broader aspects, comprises mixing two or more linear polyesters of relatively high-melting points one of which may be a copolyester, which polyesters are incompatible (insoluble or immiscible with each other), in powder or granular form, in which mixture one of the polyesters is in greater proportion than the other, and thereafter, subjecting the mixture to a molding operation under the influence of heat whereby the polyester particles are melted and caused to flow. One convenient way of producing the required flow is by running the mixture through a conventional extrusion molding machine provided with heating means to melt the material and with means, such as a screw, to force the material from the machine and through an appropriate forming die. Under these conditions, one of the polyesters forms a matrix of plastic material in which the other molten polyester material is distributed in randomly disposed discrete particles, masses, streams or irregular strata or other forms to produce in the product a pearlescent appearance.

The polyesters employed in accordance with our invention may be prepared in accordance with known procedures. In general, we have found that certain polyesters derived from terephthalic acid and 1,4-cyclohexanedimethanol are especially efficacious in producing the new pearlescent products of our invention. Such polyesters may be prepared in accordance with the disclosure of the U.S. Patents 2,901,466; 3,033,822; 3,033,826; and 3,033,827 to Kibler et al., the disclosures of which are incorporated herein by reference. In view of the fact that the preparation and characteristics of two types of polyesters are well-known to those skilled in the art, no further detailed description of their preparation need be given.

According to the practice of this invention, the polyester which is in greater proportion (i.e., the major component polyester) than the other (i.e., the minor component polyester) comprises from about 80 to about 60% by weight of the mixture of polyesters, the particular amount being dependent upon the composition of the minor component polyester. The major component polyester consists of the condensation product of a phthalic acid, such as isophthalic acid or terephthalic acid, with 1,4-cyclohexanedimethanol. In a preferred embodiment of this invention, this polyester consists of the reaction product of terephthalic acid, isophthalic acid and 1,4-cyclohexanedimethanol.

The minor component polyester, which comprises from about 20 to about 40% by weight of the mixture of polyesters, consists of the condensation product of an aliphatic dicarboxylic acid, either alone or in combination with a phthalic acid, such as isophthalic acid or terephthalic acid, with 1,4-cyclohexanedimethanol. As will appear more fully from the examples which follow, the particular composition of this polyester must be carefully controlled in order to obtain the desired pearlescent appearance. That is, when the minor component polyester consists of the reaction product of phosgene and 1,4-cyclohexanedimethanol, it should comprise from about 30 to about 40% by weight of the total mixture.

When the minor component polyester is a copolyester consisting of the condensation product of sebacic acid and a phthalic acid, it should generally comprise from about 30 to about 40% by weight of the total mixture although certain combinations of these reactants will produce a pearlescent effect at concentrations of the minor component polyester as low as about 20% by weight of the total mixture. Moreover, the total amount of the condensed sebacic acid in the polyester mixture should be less than 18 mole percent in order to obtain an extrudable mixture.

Reference has been made above in the general statement of our invention to the fact that the copolyester material is employed in powder or granular form. To obtain the best results, the materials which are solids at room temperature should be comminuted, as by grinding or other conventional comminuating operation, to such a degree of fineness as to pass a 10–30 mesh screen. In general, we prefer that the material be of such a degree of fineness as to pass a 20 mesh screen.

Reference has also been made to the mixing, melting and flowing of the mixture of comminuted polyester material in producing the pearlescent product of our invention. This operation may be accomplished by any conventional procedure which will cause the material to melt and flow. Under such conditions and in accordance with the invention, the material is subjected to such a degree of heat as will bring about melting of both polyester components in the mixture. In employing the polyester material referred to above, the mixture is subjected to a temperature slightly above the melting point of the highest melting polyester or copolyester component of the mix. As previously indicated, the melting and flowing of the material is conveniently accomplished by depositing the comminuted mixture in the hopper of a conventional extrusion molding machine and subjecting it to an elevated temperature of the order of about 288° C. The particular temperature employed will, of course, depend upon the particular polyester or copolyester material selected for making up the mix since each polyester or copolyester has its own individual melting point or melting range. Regardless of the particular product being formed, whether in sheet or other form, it is necessary that the plastic material must be melted and caused to flow in order to obtain the pearlescent effect. The molten material is then extruded from the machine through a die having an orifice giving the product the desired shape as, for example, a flat sheet, a rod, a tube or the like. When making a sheet material, it is generally desirable to extrude the molten material onto the surface of a casting wheel in order to facilitate formation of the sheet and provide means for conveniently handling the material.

If desired, various natural or synthetic dyes may be used to produce a colored pearlescent plastic product in accordance with our invention. This can be done by adding the color to the mix before the melting and flowing operation. In some cases, it may be desired to employ a polyester or copolyester which has been previously colored with suitable colorants such as transparent dyes. In other cases, both of the components of the mixture may be precolored with such dyes prior to grinding and mixing to produce in the product a variegated effect. In general, pigments should not be employed in the matrix as this obscures or tends to obscure the pearlescent effect which is produced by the striated, stratified or particulate material of the second component.

In the following examples and description, we have set forth several of the preferred embodiments of our invention, but they are included merely for purposes of illustration and not as a limitation thereof.

*Example 1*

60 parts by weight of a copolyester solid at room temperature and obtained by the interaction of 41.5 mole percent of terephthalic acid, 8.5 mole percent of isophthalic acid and 50 mole percent of 1,4-cyclohexanedimethanol was ground to a powder such that it would pass a 20 mesh screen. This powder was mixed with 40 parts by weight of a 20 mesh powder of a polyester obtained by reacting phosgene and 1,4-cyclohexanedimethanol. The mixed comminuted material was then fed into the hopper of a standard extrusion molding machine provided with heating means and a screw stuffer. As the material passed through the machine, it was subjected to a temperature of approximately 290° C., thereby causing both components of the mixture to melt and flow. The molten material was extruded from the machine through a dye with a flat rectangular orifice in the form of a sheet which was then conveyed to the surface of a chrome plated steel roll maintained at a surface temperature of 65° C. The sheet material thus produced was 10 mil thick and had a very pleasing pearlescent appearance.

*Example 2*

The process of Example 1 was repeated except that 70 parts by weight of the major component copolyester and 30 parts by weight of the minor component polyester were used. The product had a pearlescent appearance.

*Example 3*

The process of Example 1 was repeated except that 80 parts by weight of the major component copolyester and 20 parts by weight of the minor component polyester were used. The product was translucent but not pearlescent.

*Example 4*

The process of Example 1 was repeated except that the minor component polyester was replaced with an equal amount (i.e., 40 parts by weight) of a copolyester obtained by condensing 30 mole percent of sebacic acid and 20 mole percent of terephthalic acid with 50 mole percent of 1,4-cyclohexanedimethanol. The extruded sheet exhibited good pearlescence.

*Example 5*

The process of Example 4 was repeated except that 70 parts by weight of the major component copolyester and 30 parts by weight of the minor component copolyester were used. The extruded sheet showed good pearlescence.

*Example 6*

The process of Example 4 was again repeated except that 80 parts by weight of the major component copolyester and 20 parts by weight of the minor component copolyester were used. The product had a pearlescent appearance.

*Example 7*

The process of Example 1 was repeated except that the minor component polyester was replaced with an equal amount (i.e., 40 parts by weight) of a copolyester obtained by condensing 35 mole percent of sebacic acid and 15 mole percent of terephthalic acid with 50 mole percent of 1,4-cyclohexanedimethanol. The extruded sheet showed good pearlescence.

*Example 8*

The process of Example 7 was repeated except that 70 parts by weight of the major component copolyester and 30 parts by weight of the minor component copolyester were used. The extruded sheet was pearlescent in appearance.

*Example 9*

The process of Example 7 was again repeated except that 80 parts by weight of the major component copolyester and 20 parts by weight of the minor component copolyester were used. The product showed no pearlescence.

*Example 10*

The process of Example 1 was repeated except that the minor component polyester was replaced with an equal amount (i.e., 40 parts by weight) of a copolyester obtained by condensing 45 mole percent of sebacic acid and 5 mole percent of terephthalic acid with 50 mole percent of 1,4-cyclohexanedimethanol. The mixture, which contained a total of 18 mole percent of condensed sebacic acid, was too sticky to extrude.

*Example 11*

The process of Example 10 was repeated except that 70 parts by weight of the major component copolyester and 30 parts by weight of the minor component copolyester were used. A sheet was extruded which showed good pearlescence.

*Example 12*

The process of Example 10 was again repeated except that 80 parts by weight of the major component copolyester and 20 parts by weight of the minor component copolyester were used. A sheet was extruded which showed good pearlescence.

*Example 13*

The process of Example 1 was repeated except that the minor component polyester was replaced with an equal amount (i.e., 40 parts by weight) of a copolyester obtained by condensing 25 mole percent of sebacic acid and 25 mole percent of isophthalic acid with 50 mole percent of 1,4-cyclohexanedimethanol. The extruded sheet had a pearlescent appearance.

*Example 14*

The process of Example 13 was repeated except that 70 parts by weight of the major component copolyester and 30 parts by weight of the minor component copolyester were used. The extruded sheet showed pearlescence.

*Example 15*

The process of Example 13 was again repeated except that 80 parts by weight of the major component copolyester and 20 parts by weight of the minor component copolyester were used. The product did not have a pearlescent appearance.

The pearlescent plastic product of our invention can be used in a wide variety of applications. For example, pearlescent polyester sheets produced in accordance with the invention may be employed as decorative materials, wrapping materials, book covers and, in the appropriate thickness, may be employed in the manufacture of containers of many different kinds. The material may also be used as decorative paneling or may be laminated to a base such as paper, cardboard, plywood, sheet metal and the like to produce products useful in various industrial applications. The pearlescent plastic polyester material may also be extruded in the form of tubes, rods and the like or may be formed into any type of desired object by injection molding or other well-known molding processes.

Although the invention has been described in considerable detail with particular reference to certain preferred embodiments thereof, variations and modifications can be effected within the spirit and scope of the invention as described hereinabove, and as defined in the appended claims.

We claim:

1. A process of producing a biphase polyester polymeric product having a pearlescent appearance which comprises forming a comminuted mixture containing from about 70 to about 60% by weight of a copolyester of terephthalic acid and isophthalic acid with 1,4-cyclohexanedimethanol and from about 30 to about 40% by weight of a polyester of carbonic acid with 1,4-cyclohexanedimethanol, heating the mixture to the melting point of the highest melting component and causing the molten material to flow.

2. The pearlescent polymeric product of claim 1.

3. A process as defined by claim 1 wherein the copolyester is of about 41.5 mole percent of terephthalic acid and about 8.5 mole percent of isophthalic acid with about 50 mole percent of 1,4-cyclohexanedimethanol.

4. A process of producing a biphase polyester polymeric product having a pearlescent appearance which comprises forming a comminuted mixture containing from about 70 to about 60% by weight of a copolyester of terephthalic acid and isophthalic acid with 1,4-cyclohexanedimethanol and from about 30 to 40% by weight of a copolyester of sebacic acid and a phthalic acid with 1,4-cyclohexanedimethanol, the total amount of the condensed sebacic acid in the polyester mixture being less than 18 mole percent, heating the mixture to the melting point of the highest melting component and causing the molten material to flow.

5. The pearlescent product of claim 4.

6. A process as defined by claim 4 wherein the first copolyester component is of about 41.5 mole percent of terephthalic acid and about 8.5 mole percent of isophthalic acid with about 50 mole percent of 1,4-cyclohexanedimethanol.

7. A process as defined by claim 6 in which the second copolyester component is of 30 mole percent of sebacic acid and about 20 mole percent of terephthalic acid with about 50 mole percent of 1,4-cyclohexanedimethanol.

8. A process as defined by claim 6 in which the second copolyester component is of about 35 mole percent of sebacic acid and about 15 mole percent of terephthalic acid with about 50 mole percent of 1,4-cyclohexanedimethanol.

9. A process as defined by claim 6 in which the second copolyester component is of about 45 mole percent of sebacic acid and about 5 mole percent of terephthalic acid with about 50 mole percent of 1,4-cyclohexanedimethanol.

10. A process as defined by claim 6 in which the second copolyester component is of about 25 mole percent of sebacic acid and about 25 mole percent of isophthalic acid with about 50 mole percent of 1,4-cyclohexanedimethanol.

11. The pearlescent product of claim 3.

12. The pearlescent product of claim 6.

References Cited by the Examiner

UNITED STATES PATENTS

| | | | |
|---|---|---|---|
| 2,353,457 | 7/1944 | Goessling | 264—77 |
| 2,996,474 | 8/1961 | Voigt | 264—75 |
| 3,037,960 | 6/1962 | Frazer | 260—860 |
| 3,218,372 | 10/1965 | Okamua et al. | 260—860 |
| 3,228,997 | 1/1966 | Armstrong et al. | 260—860 |

MURRAY TILLMAN, *Primary Examiner.*

J. T. GOOLKASIAN, *Assistant Examiner.*